US009325801B2

(12) United States Patent
Oh et al.

(10) Patent No.: US 9,325,801 B2
(45) Date of Patent: Apr. 26, 2016

(54) METHOD AND SYSTEM FOR CONTENT LEVEL REACTIVE AUTHORIZATION

(75) Inventors: Jae-Kwon Oh, Seoul (KR); Arun Prasath Ramamoorthy, Bangalore (IN); Mayuresh Madhukar Patil, Bangalore (IN)

(73) Assignee: Samsung Electronics Co., Ltd (KR)

( * ) Notice: Subject to any disclaimer, the term of this patent is extended or adjusted under 35 U.S.C. 154(b) by 908 days.

(21) Appl. No.: 12/663,673

(22) PCT Filed: Jun. 9, 2008

(86) PCT No.: PCT/KR2008/003208
§ 371 (c)(1),
(2), (4) Date: Apr. 1, 2010

(87) PCT Pub. No.: WO2008/150146
PCT Pub. Date: Dec. 11, 2008

(65) Prior Publication Data
US 2011/0131629 A1 Jun. 2, 2011

(30) Foreign Application Priority Data

Jun. 8, 2007 (IN) .......................... 1192/CHE/2007
Jun. 5, 2008 (KR) ........................ 10-2008-0053284

(51) Int. Cl.
*H04L 29/06* (2006.01)
*G06F 21/00* (2013.01)
*H04L 29/08* (2006.01)

(52) U.S. Cl.
CPC .............. *H04L 67/24* (2013.01); *H04L 63/102* (2013.01); *H04L 65/1006* (2013.01)

(58) Field of Classification Search
CPC .... H04L 67/24; H04L 63/102; H04L 65/1006
USPC ............. 726/28; 713/163; 709/208, 223, 203, 709/220; 340/573.4
See application file for complete search history.

(56) References Cited

U.S. PATENT DOCUMENTS

2003/0217099 A1* 11/2003 Bobde .................... H04L 29/06
709/202
2004/0071150 A1 4/2004 Honkala et al.
(Continued)

FOREIGN PATENT DOCUMENTS

KR 10-2005-0055687 6/2005
KR 10-2006-0070339 A 6/2006
WO WO 2011093754 A1 * 8/2011 ............ H04L 63/105

OTHER PUBLICATIONS

Tokunaga, K.; Baba, H.; Takaya, N.; Kurokawa, A.; "IMS presence authorization applied to Web applications using REST"; Intelligence in Next Generation Networks, 2009. ICIN 2009. 13th International Conference on Digital Object Identifier: 10.1109/ICIN.2009. 5357060; Publication Year: Sep. 2009; pp. 1-6.*
Whai-En Chen; Yi-Bing Lin; Ren-Huang Liou; "A weakly consistent scheme for IMS presence service"; Wireless Communications, IEEE Transactions on Year: Jul. 2009, vol. 8, Issue: 7; pp. 3815-3821.*

(Continued)

*Primary Examiner* — Andrew Nalven
*Assistant Examiner* — Courtney Fields
(74) *Attorney, Agent, or Firm* — The Farrell Law Firm, P.C.

(57) ABSTRACT

Disclosed is a new system and method for the "Content-level Reactive Presence Authorization", wherein the Presentity would be able to reactively authorize the Watcher requested contents of the Presentity's Presence Information. According to the system and method for the Content-level Reactive Presence Authorization, it is possible for the Presence Server to convey the identity of the Watchers and the protected contents to the Presentity on the states of the Watcher's requested contents of the Presence Information. According to the systems and methods, it is also possible for Presentity to specify the conditions when the Presence Server triggers such Content-level Reactive Presence Authorization.

18 Claims, 6 Drawing Sheets

(56) References Cited

U.S. PATENT DOCUMENTS

| | | | |
|---|---|---|---|
| 2004/0139198 A1 | 7/2004 | Costa-Requena et al. | |
| 2007/0024453 A1* | 2/2007 | Mohammed et al. | 340/573.4 |
| 2007/0214243 A1* | 9/2007 | Bao et al. | 709/220 |
| 2008/0028211 A1* | 1/2008 | Tanizawa et al. | 713/163 |
| 2008/0240384 A1* | 10/2008 | Suryanarayana et al. | 379/88.21 |
| 2008/0263137 A1* | 10/2008 | Pattison et al. | 709/203 |
| 2009/0300158 A1* | 12/2009 | Bobde et al. | 709/223 |

OTHER PUBLICATIONS

Open Mobile Alliance, Presence SIMPLE Specification, Draft Version 2.0, XP003016804, OMA-TA-Presence_SIMPLE-V2_0-20061123-D, Nov. 23, 2006, 96 pages.

European Search Report dated Mar. 10, 2016 issued in counterpart application No. 08766170.8-1853, 9 pages.

* cited by examiner

METHOD AND SYSTEM FOR CONTENT LEVEL REACTIVE AUTHORIZATION

TECHNICAL FIELD

The present invention, in general, relates to the field of SIP based presence applications as defined by the OMA specifications. The invention proposes reactive authorization based on content requested by a watcher. More particularly the present invention relates to method and system for content level reactive authorization.

BACKGROUND ART

In the currently existing mechanism, by using the Presence Authorization Policies the Presentity can tell the Presence Server who are authorized to watch his/her Presence Information and, if authorized to watch, what part of his/her Presence Information they can see. Such Presentity's Presence Authorization Policies are represented as Presence Authorization Rule XML document and stored in Presence XML Document Management Server (XDMS). The Presence Authorization Rule consists of two parts; Subscription Authorization Rule that determines who is authorized to subscribe to the Presentity's Presence Information, and Presence Content Rule that determines which contents of the Presentity's Presence Information are authorized to be delivered to the subscribing Watcher.

The following Table 1 shows the example of the Presence Authorization Rule. In this example, the rule specifies that the user with the URI of either "tel:+43012345678" or "sip:Hermione.blosson@exmaple.com" is allowed to subscribe the Presentity's Presence Information, and the subscribed user with the URI of either "tel:+43012345678" or "sip:Hermione.blosson@exmaple.com" is allowed to be provided with the 'PoC' service, 'willingness', and 'status-icon' related presence attributes.

```
<?xml version="1.0" encoding="UTF-8"?>
<cr:ruleset
  xmlns:op="urn:oma:xml:prs:pres-rules"
  xmlns:pr="urn:ietf:params:xml:ns:pres-rules"
  xmlns:cr="urn:ietf:params:xml:ns:common-policy">
  <cr:rule id="ck81">
    <cr:conditions>
      <cr:identity>
        <cr:one id="tel:+43012345678"/>
        <cr:one id="sip:hermione.blossom@example.com"/>
      </cr:identity>
    </cr:conditions>
    <cr:actions>
      <pr:sub-handling>allow</pr:sub-handling>
    </cr:actions>
    <cr:transformations>
      <pr:provide-services>
        <op:service-id>org.openmobilealliance:PoC-session</op:service-id>
      </pr:provide-services>
      <op:provide-willingness>true</op:provide-willingness>
      <pr:provide-status-icon>true</pr:provide-status-icon>
    </cr:transformations>
  </cr:rule>
</cr:ruleset>
</cr:transformations>
  </cr:rule>
</cr:ruleset>
```

When a Presence Server receives a SUBSCRIBE request on a Presentity's Presence Information from a Watcher, the Presence Server fetches the Presentity's Presence Authorization Rules from Presence XDMS, and uses it to authorize the Watcher with regards to subscription request and the parts of Presence Information to be delivered. The Presence Server keeps synchronized with the Presence XDMS by "xcap-diff" event package subscription such that the changes in the Presentity's Presence Authorization Rules could be instantly reflected in the Presence Server's handling of the Presence Information requests and delivery. This is called as Proactive Presence Authorization as the Presence Server can perform authorization for itself based on the predescribed static rules (i.e., Presence Authorization Rules in Presence XDMS) and without the need of direct interaction with Presentity.

Also, the Reactive Presence Authorization, where the Presence Server authorizes the Watcher's subscription requests to the Presentity's Presence Information per the Presentity's reaction on those, can be achieved by the following procedure: Firstly, the Presentity needs to subscribe for "presence.winfo" event package to Presence Server. Upon this event subscription, the Presence Server notifies the Presentity of the current status of Watcher lists and their corresponding subscription states. With this information, the Presentity can identify which Watcher is 'pending' subscription state and, if the Presentity wants to allow the Watcher to see his Presence Information, the Presentity revises the Presence Authorization Rule in Presence XDMS as such. Such modifications of the rules are notified to the Presence Server and then the Presence Server applies those updated Presence Authorization Rules to handle the 'pending' subscription requests from the Watchers. The example flows of how the current reactive Presence Authorization mechanism works are shown in FIG. 1 and the steps involved are discussed in the followings.

The following describes each step in FIG. 1:

Note: Presence Server subscribing for changes to Presence Authorization Rule documents stored in Presence XDMS is omitted from the above FIG. 1 for simplicity.

In step 100, the Presentity 20 wishing to know the list of watchers who are subscribed for his/her Presence Information sends a SIP SUBSCRIBE request to SIP/IP core 30 subscribing for "presence.winfo" event package.

In step 102, the SIP/IP core 30 forwards the request to the Presence Server 40 of Presentity's domain.

In step 103, the Presence Server 40 processes the received SIP SUBSCRIBE and upon successful processing sends 200 OK response to SIP/IP Core 30.

In step 104, the SIP/IP core 30 forwards the 200 OK response to the Presentity 20.

In step 105, the Presence Server 40 sends SIP NOTIFY request containing the details of Watchers to the SIP/IP core 30.

In step 106, the SIP/IP core 30 forwards the SIP NOTIFY request to the Presentity 20.

In step 107, the Presentity 20 sends the 200 OK responses for the SIP NOTIFY request.

In step 108, the SIP/IP core 30 forwards the 200 OK responses to the Presence Server 40.

In step 109, Watcher 50 wishing to subscribe for Presence Information of the Presentity 20 sends a SIP SUBSCRIBE request to the SIP/IP Core 30.

In step 110, the SIP/IP Core 30 forwards the SIP SUBSCRIBE to the Presence Server 40.

In step 111, the Presence Server 40 processes the received SIP SUBSCRIBE and finds out that the Watcher 50 is not authorized to subscribe for Presentity's Presence Information and hence acknowledges the SIP SUBSCRIBE with "202 Accepted" responses.

In step 112, the SIP/IP Core 30 forwards the "202 Accepted" responses to the Watcher 50.

In step 113, as soon as the presence server 40 sends a SIP 202 Accepted response to accept the subscription, it sends a SIP NOTIFY request to the Watcher 50 as mandated by [RFC3265]. At this time, the Presence Information to be delivered to the Watcher 50 may be not available yet as the Watcher has not yet been authorized to see the Presentity's Presence Information. As such, a "dummy" SIP NOTIFY request can be sent, with a valid neutral or empty Presence Information and a valid Subscription-State header field (set to "pending") for the time being.

In step 114, the SIP/IP Core 30 forwards the SIP NOTIFY request with the 'dummy" Presence Information to the Watcher 50.

In step 115, the Watcher 50 sends 200 OK responses to the received SIP NOTIFY request.

In step 116, the SIP/IP Core 30 forwards 200 OK response to the Presence Server 40.

In step 117, the Presence Server 40 sends a SIP NOTIFY request to the Presentity 20 which contains the detailed lists of the Watchers who have subscribed for Presentity's Presence Information and the state of the subscription which is "pending" in this case.

In step 118, the SIP/IP Core 30 forwards the SIP NOTIFY request to the Presentity 20.

In step 119, the Presentity 20 acknowledges the SIP NOTIFY request with 200 OK response.

In step 120, the SIP/IP Core 30 forwards the 200 OK response to the Presence Server 40.

In step 121a, after getting to know the Watcher's identity who is 'pending' subscription state, the Presentity 20 wishes to authorize the Watcher 50 to view his/her Presence Information and hence the Presentity 20 does the XCAP operations in which to update Presence Authorization Rule (RFC 4825, "The Extensible Markup Language (XML) Configuration Access Protocol (XCAP)"). As such, the Presentity 20 changes the Presence Authorization Rule document to authorize the Watcher 50.

Note: For brevity sake, the details of XCAP operations in step 121b and the details of Presence Server getting to know the changes in the Presence Authorization Rules in Presence XDMS are not shown.

In step 122, the Presence Server 40 authorizes the Watcher 50 per the updated Presence Authorization Rule and issues another SIP NOTIFY containing the valid Presence Information which he/she is authorized to view per the updated Presence Authorization Rule.

In step 123, the SIP/IP Core 30 forwards the SIP NOTIFY to the Watcher 50.

In step 124, the Watcher 50 sends 200 OK response for SIP NOTIFY request.

In step 125, the SIP/IP Core 30 forwards the 200 OK response to the Presence Server 40.

DISCLOSURE

Technical Problem

In the current mechanism, the base is the Proactive Presence Authorization mechanism based on the static rule named "Presence Authorization Rule" in Presence XDMS. The Reactive Presence Authorization can be achieved by the indirect way where the Presentity subscribes "presence.winfo" event package, identifies the pending subscription request from Watchers by getting notification of "presence.winfo" event, updating the static rule of "Presence Authorization Rule" in Presence XDMS, then the Presence Server gets notified of such changes in the rules and applies it to the pending subscriptions.

With the current presence authorization mechanism, the following limitations are observed:

A) In the current mechanism, the above Reactive Presence Authorization applies only to the Watcher's subscription request, i.e., it is only about whether to allow a presence subscription request or not. In other words, the authorization for the requested contents of presence information is not possible. As such, there's no way to reactively authorize the Watcher's requested contents. This results in the situation where: once the requested presence contents by Watcher have not been allowed by the Presence Authorization Rule, those contents keep persistently blocked to be delivered to the Watcher until the Presentity somehow voluntarily revises the Presence Content Rule of Presence Authorization Rule in Presence XDMS to allow the blocked contents to the Watcher.

B) In the current mechanism, there's no way for Presentity to specify the conditions when the Presence Server to request to Presentity for the Reactive Presence Authorization.

C) In the current mechanism, the Reactive Presence Authorization can be achieved only by revising the persistent static rule of "Presence Authorization Rule" in Presence XDMS. So, it is not possible for Presentity to perform one-time authorization which is valid only for the Watcher's active subscription duration, without affecting the static "Presence Authorization Rule" in Presence XDMS.

D) In the current mechanism, the Reactive Presence Authorization can be achieved only by indirect manner. i.e., there's no way for Presence Server to directly request the Presentity for the Reactive Presence Authorization on Watcher's request, without using the "presence.winfo" event notification, to get the on-the-fly Reactive Presence Authorization from the Presentity.

Therefore, there is a need of a system and method that can tackle the above limitations of the current presence authorization mechanism.

Technical Solution

In the purpose to cope with the above limitations of the existing arts, this invention proposes new systems and methods for the "Content-level Reactive Presence Authorization" wherein the Presentity would be able to reactively authorize the Watcher requested contents of the Presentity's Presence Information. For this Content-level Reactive Presence Authorization, this invention proposes new systems and methods where the Presence Server is able to convey to the Presentity on the states of the Watcher's requested contents of the Presence Information. Also, this invention proposes the systems and methods where the Presentity can specify the conditions when the Presence Server to trigger such Content-level Reactive Presence Authorization.

Further, this invention proposes the systems and methods where the Presentity can achieve "Dynamic Reactive Presence Authorization" without the need to modify the static Presence Authorization Rule in Presence XDMS, but by directly delivering the reactive authorization to the Presence Server. Also, this invention proposes the systems and methods where the Presence Server can directly request the Presentity for the Reactive Presence Authorization without the help of "presence.winfo" event package, so that the Presence Server can get the instant response from the Presentity on the Reactive Presence Authorization.

Advantageous Effects

According to the present invention, it is possible for the Presentity to reactively authorize the Watcher requested contents. Moreover, when the Presence Server requests the Presentity to authorize the Reactive Presence Authorization, the Presentity may specify the condition for the authorization. Furthermore, according to the present invention, it is possible for the Presentity to perform one-time authorization which is valid only for the Watcher's active subscription duration, without affecting the static "Presence Authorization Rule" in Presence XDMS. It is also possible for the presence server to directly request the Presentity to perform authorization for Reactive Presence Authorization on the watcher request and acquire the Reactive Presence Authorization instantly in response to the request.

BRIEF DESCRIPTION OF THE DRAWINGS

The foregoing and other objects, features and advantages of the present invention will become more apparent from the following detailed description when taken in conjunction with the accompanying drawings in which.

BEST MODE

Mode for Invention

Hereinafter, exemplary embodiments of the present invention will be described with reference to the accompanying drawings.

The main arm of this invention is to enable the Presentities to protect the contents of the PUBLISHed Presence Information in more delicate manner. For this purpose, this invention proposes the systems and methods for the "Content-level Reactive Presence Authorization", wherein the Presentity would be able to reactively authorize the Watcher requested contents of the Presentity's Presence Information.

Figure 1:
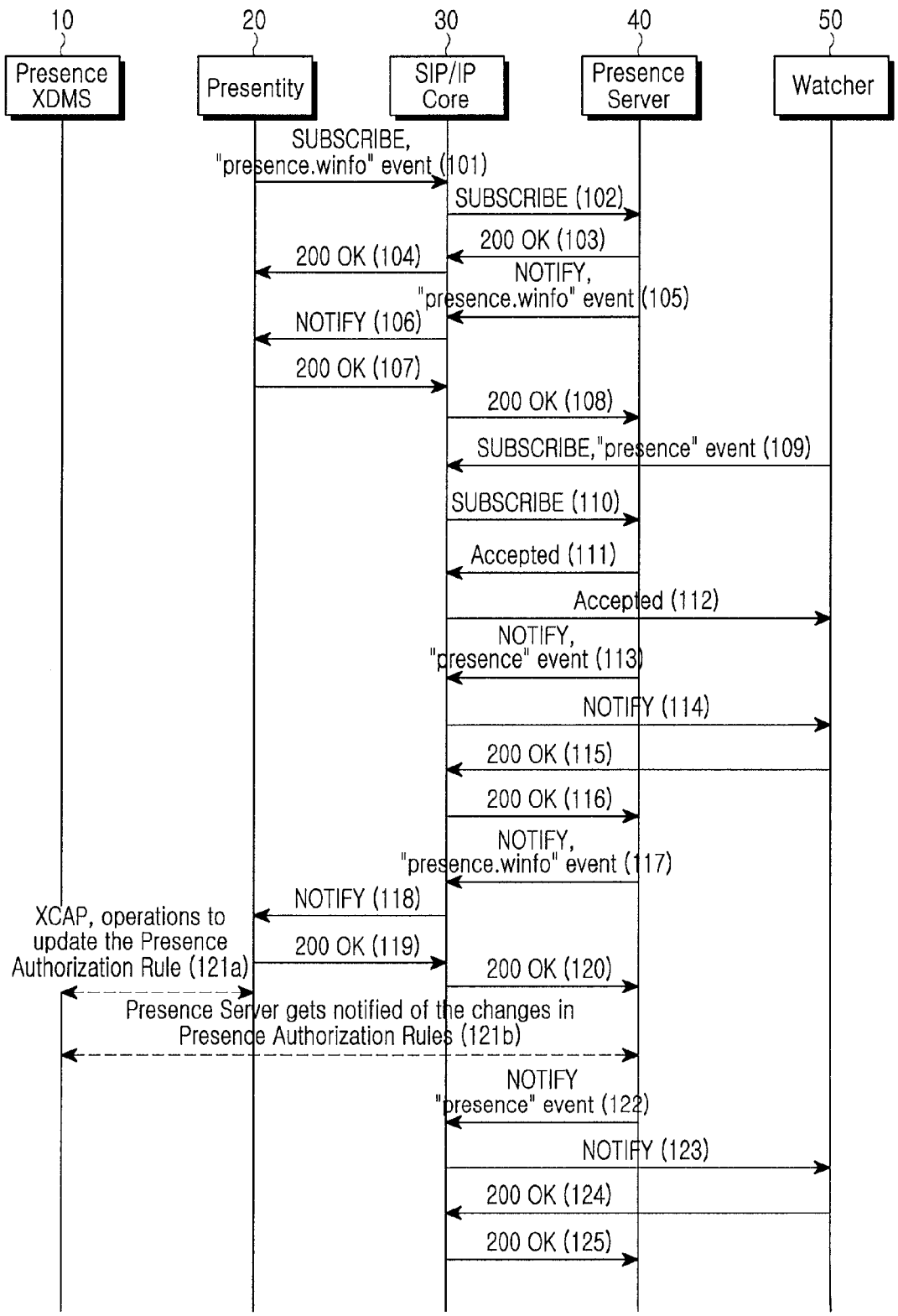
FIG. 1 depicts presence information example flows for reactive presence Authorization per the existing methods.
Figure 2:
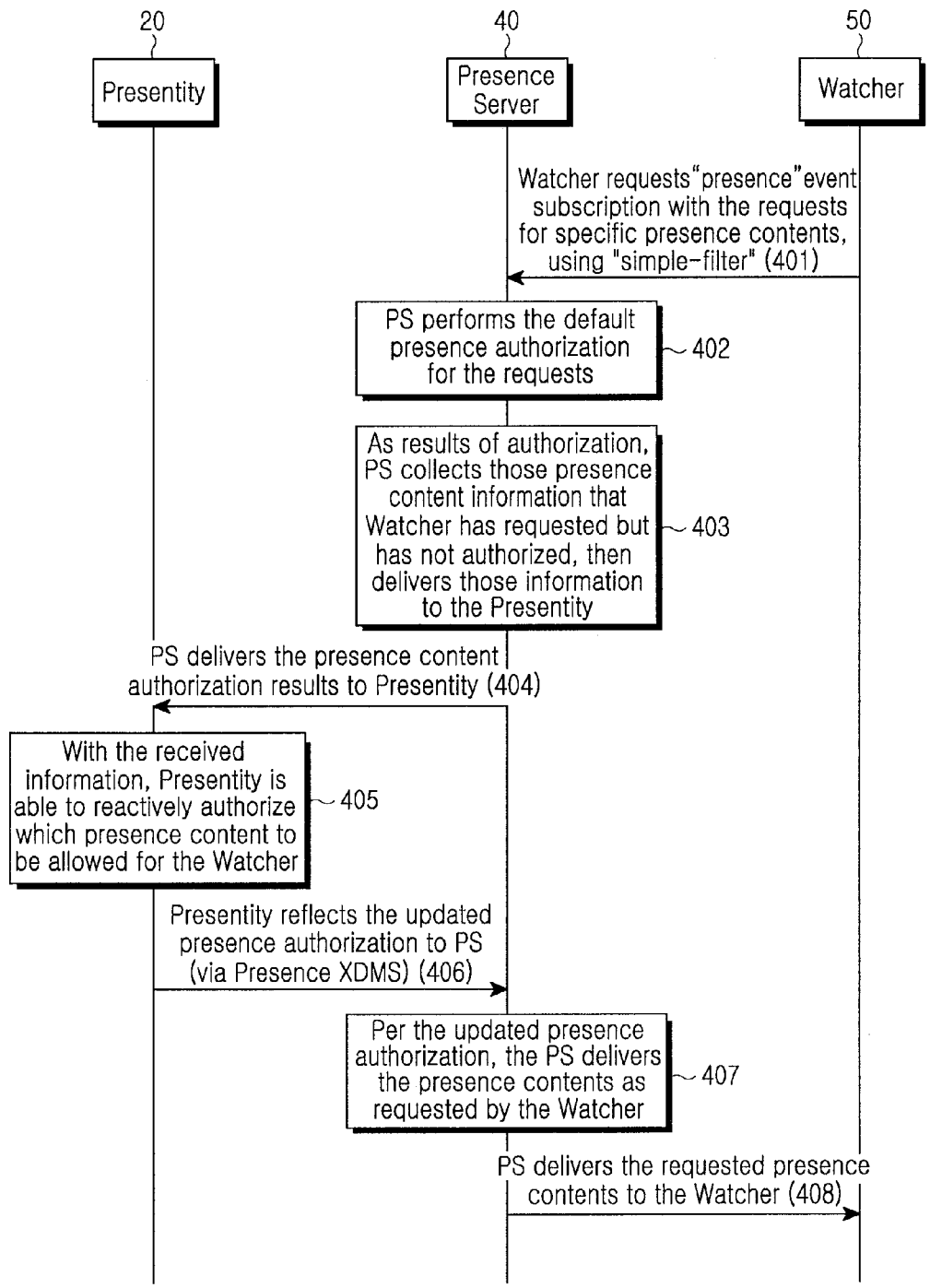
FIG. 2 depicts overall logical flows associated with the Content-level Reactive Presence Authorization proposed in the present invention.

FIG. 2 depicts overall logical flows associated with the Content-level Reactive Presence Authorization proposed in the present invention. Steps of the logical flows are as follows.

NOTE: SIP/IP core is omitted from the above FIG. 2 for simplicity.

In step 401, the Watcher 50 makes a request for subscription to a Presence event. That is, the Watcher 50 subscribes to the Presence Information of the Presentity. The Watcher 50 can specifically request for the interested Presence Information by including the "application/simple-filter+xml" in the body of the SIP SUBSCRIBE request.

In step 402, after receiving the SIP SUBSCRIBE request, the Presence Server 40 applies corresponding Presence Authorization rules to the Watcher 50. For example, the Presence Server 40 performs default Presence Authorization.

In step 403, the Presence Server 40 collects presence content information which is not authorized in spite of the request of the Watcher 50 according to the result of the authorization.

In step 404, the Presence Server 40 delivers the result of the Presence content authorization to the Presentity 20. If the Presence Server 40 acknowledges the Watcher's requested contents that are not allowed by the Presence Authorization Rule, the Presence Server 40 decides the contents as "protected content", and then delivers these protected content to the Presentity 20.

In step 405, the Presentity 20 receives the details of the Protected content requested by the Watcher. Then, the Presentity 20 determines which Presence content to be allowed for the Watcher 50 after bringing the received details.

In step 406, when the Presentity 20 wants to allow the Watcher 50 to view the protected content, the Presentity 20 updates Presence Authorization Rule in order to authorize the protected content for the Watcher 50. This update process may be achieved by modifying Presence Authorization Rule stored in Presence XDMS or by directly instructing the Presence Server 40 to do it.

In step 407, the Presence Server 40 may acknowledge the changes in the Presence Authorization Rule and deliver the Presence contents as requested by the Watcher 50, by the updated Presence Authorization.

In step 408, the Presence Server 40 delivers the Presence contents allowed by the updated Presence Authorization to the Watcher 50.

The present invention proposes achieving Content-level Reactive Authorization through the following two ways.
1. Static Mechanism
2. Dynamic Mechanism
1. Static Mechanism—In this method the Presentity has to modify the Presence Authorization Rules document to include the information about which part of the PUBLISHed Presence Information is private that requires Reactive Presence Authorization and to what Watchers. The changes are static i.e. the modification gets stored in the Presence XDM and persistent across the Sessions. In this method the Presentity, after knowing the details of watchers and the content they have requested, has to do XCAP operation to modify the Presence Authorization Rule in Presence XDMS to authorize the watchers and the requested contents.

In order to achieve this Content-level Reactive Presence Authorization by the static manner, the following mechanisms are required:

i. Presentity specifying the conditions for Presence Server to trigger the Content-level Reactive Presence Authorization for protected contents;

ii. Conveying the identity of the Watchers and the protected contents to Presentity;

iii. Presentity performing the Content-level Reactive Presence Authorization by modifying Presence Authorization Rule.

However, it should be noted that the Presence Server does not perform a procedure of Reactive Presence Authorization only when the Presentity specifies performance of Reactive Content Authorization, as described in i mechanism. That is, even if the Presentity does not specify the conditions for Reactive Content Authorization, the Presence Server may always perform a Reactive Presence Authorization procedure as a basic operation.

1.1 Presentity Specifying the Conditions for Presence Server to Trigger the Reactive Presence Authorization for Protected Contents Approach 1

This invention proposes to extend the existing Presence Authorization Rule document such that Presentity can also specify the conditions for Presence Server to trigger the Content-level Reactive Presence Authorization on the protected contents in case there are some Watchers who has requested those. In order for this, this invention proposes to extend the "actions" element in Presence Authorization Rule to contain the "protected-content-handling" element, the value of which specifies what the Presence Server need to do when the Watcher has requested the protected contents, i.e., when the Watcher requested more contents than allowed in <transformations>.

For backward compatibility, the default value should be "ignore", where those request on protected contents will be ignored and not be delivered to Watcher.

Other value could be "confirm" that initiates Reactive Presence Authorization to the Presentity as proposed by this invention.

The following Presence Authorization Rule document as shown in Table 2 specifies the Presentity's predefined permissions on the Presentity's Presence Information requests by the Watcher "sip:user@example.com". Per this invention, this Presence Authorization Rule is extended to contain the conditions for the Content-level Reactive Presence Authorization by the "protected-content-handling" action element with its value set as "confirm".

```
<?xml version="1.0" encoding="UTF-8"?>
<cr:ruleset
    xmlns:op="urn:oma:xml:prs:pres-rules"
    xmlns:pr="urn:ietf:params:xml:ns:pres-rules"
    xmlns:rpid="urn:ietf:params:xml:ns:pidf:rpid"
    xmlns:ext="urn: content-auth"
    xmlns:cr="urn:ietf:params:xml:ns:common-policy">
  <cr:rule id="ck81">
    <cr:conditions>
      <cr:identity>
        <cr:one id="sip:user@example.com"/>
      </cr:identity>
    </cr:conditions>
    <cr:actions>
      <pr:sub-handling>allow</pr:sub-handling>
            <ext:protected-content-handling>confirm</ext:protected-content-handling>
    </cr:actions>
    <cr:transformations>
      <pr:provide-services>
        <op:service-id>org.openmobilealliance:PoC-session</op:service-id>
      </pr:provide-services>
      <op:provide-willingness>true</op:provide-willingness>
      <pr:provide-status-icon>true</pr:provide-status-icon>
    </cr:transformations>
  </cr:rule>
</cr:ruleset>
```

Table 2 shows an example of a Presence Authorization Rule with the conditions to trigger the Content-level Reactive Presence Authorization based on approach 1.

The following Table 3 is the schema definition for the extension to Presence Authorization Rule for the conditions for the Content-level Reactive Presence Authorization as described in this section.

```
<?xml version="1.0" encoding="UTF-8"?>
<xs:schema xmlns="urn:content-auth"
            xmlns:xs="http://www.w3.org/2001/XMLSchema"
            targetNamespace="urn:content-auth"
            elementFormDefault="qualified">
  <!-- Extend <actions> element to include <protected-content-handling> -->
  <xs:element name="protected-content-handling">
    <xs:simpleType>
      <xs:restriction base="xs:token">
        <xs:enumeration value="ignore"/>
        <xs:enumeration value="confirm"/>
      </xs:restriction>
    </xs:simpleType>
  </xs:element>
</xs:schema>
```

Table 3 shows schema definition for element to specify the conditions to trigger the Content-level Reactive Presence Authorization.

Approach 2

Alternatively, as showed in the following example below, the Presentity can specify the content information that always needs Content-level Reactive Presence Authorization. E.g., for the request for location information related Presence Information, Presentity always wants to authorize it reactively. This rule cannot occur with the above Approach 1), and will be described per presence attributes. So, in this approach, other requests for the protected contents will be ignored as it has been. The following Table 4 is an example of this rule. Note the changes in <identity> condition and <content-handling> action. So, in this case, only the request for "geopriv" presence attributes per RFC 4119 will be asked to Presentity for the Content-level Reactive Presence Authorization, while the requests for all other protected contents being ignored.

```
<?xml version="1.0" encoding="UTF-8"?>
<cr:ruleset
    xmlns:op="urn:oma:xml:prs:pres-rules"
    xmlns:pr="urn:ietf:params:xml:ns:pres-rules"
    xmlns:rpid="urn:ietf:params:xml:ns:pidf:rpid"
    xmlns:ext="urn:content-auth"
    xmlns:cr="urn:ietf:params:xml:ns:common-policy">
  <cr:rule id="ck81">
    <cr:conditions>
      <cr:identity>
            <!-- This matches all authenticated identity -->
        <cr:many/>
      </cr:identity>
    </cr:conditions>
    <cr:actions>
            <ext:content-handling>
         <ext:handling-geopriv/>confirm</ext:handling-geopriv>
            </ext:content-handling>
    </cr:actions>
    <cr:transformations/>
  </cr:rule>
</cr :ruleset>
```

Table 4 shows Presence Authorization Rule with the conditions to trigger the Content-level Reactive Presence Authorization based on Approach 2.

The following Table 5 is the schema definition for the above extension to Presence Authorization Rule per Approach2. Note that only the "handling-geopriv" element for the handling on the requests for 'geopriv' presence attributes is defined in the following. The elements for other presence attributes can be defined in similar way:

```
<?xml version="1.0" encoding="UTF-8"?>
<xs:schema          xmlns="urn:content-auth"
xmlns:xs="http://www.w3.org/2001/XMLSchema"
targetNamespace="urn:content-auth" elementFormDefault="qualified">
<!-- Extend <actions> element to include <content-handling> -->
        <xs:element name="content-handling">
            <xs:complexType>
                <xs:sequence>
                    <xs:element name="handling-geopriv" minOccurs="0">
                        <xs:simpleType>
                            <xs:restriction base="xs:token">
                                <xs:enumeration value="ignore"/>
                                <xs:enumeration value="confirm"/>
                            </xs:restriction>
                        </xs:simpleType>
                    </xs:element>
<!-- Elements for other presence attributes handling can be defined -->
<xs:any namespace="##other" processContents="lax" minOccurs="0"
maxOccurs="unbounded"/>
                </xs:sequence>
            </xs:complexType>
        </xs:element>
</xs:schema>
```

Table 5 shows Schema definition for element to specify the conditions to trigger the Content-level Reactive Presence Authorization based on Approach 2.

However, it is noted that the process described in the 1.1 section is not required when the Presence Server performs a Reactive Presence Authorization procedure as a basic operation. That is, even when the Presentity does not specify performance or non-performance of the Reactive Content Authorization procedure by the Presence Authorization Rule, the Presence Server may perform a corresponding Reactive Content Authorization procedure as a basic operation.

1.2 Conveying the Identity of the Watchers and the Protected Contents to Presentity In order to achieve the Content-level Reactive Presence Authorization the Presentity should know the identity of the Watchers who are requesting for protected part of Presence Information and what part of protected content they are interested in. Currently the Presentity can be aware of Watchers who are interested in his/her Presence Information by subscribing to Watcher information event package (RFC 3857, "A Watcher Information Event Template-Package for the Session Initiation Protocol (SIP)") but what content they are interested remains unknown to the Presentity. This invention requires the Presentity to know what part of the protected Presence Information the Watcher is interested in. This can be achieved in the following ways:

Extending the format of Watcher Information (RFC 3858) to include the information about the protected contents of the Presence Information that the Watcher is interested in; Creation of new Event Package, e.g., named "presence.winfo-.content" to convey the information about the protected contents of the Presence Information that the Watcher is interested in.

1.2.1 Extending the Format of Watcher Information

Currently the Presentity can learn about the list of Watchers who have subscribed for his/her Presence Information by subscribing to the "presence.winfo" event package (RFC 3858). But with this mechanism the Presentity cannot know what content is requested by the Watchers. In order to achieve the Content-level Reactive Presence Authorization there is a need that Presentity must be aware of what content is requested by which Watcher.

It becomes very difficult to convey all the contents that are requested by the Watcher. Instead it is enough if the Presentity knows about the Watchers who have requested to view the part of Presence Information which is marked protected by the Presentity in the Presence Authorization policy document in Presence XDMS. In order to convey this kind of information to Presentity, this invention proposes to extend the schema defined for Watcher Information Format (RFC 3858) to include the details of the protected Presence Information if any, requested by any Watcher. There can be two approaches to extend the "presence.winfo" event package as described in the following.

Approach 1

In this approach the root element "watcherinfo" of the Watcher information document as described in RFC 3858 is extended to contain "watcher-contents-list" element which carries the details of the contents requested by each Watchers and their identity. "watcher-contents-list" element contains "ns-bindings" element to specify the namespace bindings for the Presence Information. "ns-bindings" element contains any number of "ns-binding" elements. The format of "ns-bindings" and "ns-binding" elements are similar to the format as described in RFC 4661. "watcher-contents-list" element contains any number of "watcher-contents" element to carry the details of Watchers and the Presence Information they have requested. The "watcher-contents" element must have an attribute named "watcher" whose value is URI of the Watcher and also this element contains any number of "content" elements and each "element carries the details and the state of the part of the Presence Information which the Watcher has requested. There are two attributes associated with the "content" element, both of which must be present:

Status: The status of the authorization for the content described by "content" element whose value could be "pending".

Type: Its value should be "xpath" to tell that the value of the "content" element is an XML element.

The following Table 6 is an example of Watcher information extension for a Presentity sip:mayur@samsung.com which uses the format described as above in Approach1. There are two watchers, userA and userB, whose URI is "sip:userA@example.com" and "sip:userB@example.com", respectively. The Watchers have requested to view the Presentities mood, activities and place-type information and the same are marked as private by the Presentity for the Watchers userA and userB. The Presentity comes to know about this through the NOTIFY request on the "presence.winfo" Watcher information event as extended by the above approach I. If the Presentity is willing to authorize the Presentity will XCAP operation to modify the Presence Authorization document to allow to Watchers those contents that they have requested.

```
<?xml version="1.0"?>
<watcherinfo xmlns="urn:ietf:params:xml:ns:watcherinfo"
xmlns:rpid="urn:ietf:params:xml:ns:pidf:rpid"
xmlns:ext="urn:watcherContentInfo"
version="0" state="full">
<watcher-list resource="sip:mayur@samsung.com" package="presence">
        <watcher   status="active"   id="8ajksjda7s"   duration-
subscribed="509" event="approved" >sip:userA@example.net</watcher>
        <watcher status="pending" id="hh8juja87s997-ass7"
display-name="Mr. Subscriber"
event="subscribe">sip:userB@example.org</watcher>
</watcher-list>
<ext:watcher-contents-list>
    <ext:ns-bindings>
            <ext:ns-binding                           prefix="pidf"
urn="urn:ietf:params:xml:ns:pidf"/>
            <ext:ns-binding                            prefix="dm"
urn="urn:ietf:params:xml:ns:pidf:data-model"/>
            <ext:ns-binding                           prefix="rpid"
urn="urn:ietf:params:xml:ns:pidf:rpid"/>
```

```
            <ext:ns-binding                prefix="gp"
urn="ietf:params:xml:ns:pidf:geopriv10"/>
      </ext:ns-bindings>
      <ext:watcher-contents watcher="sip:userA@example.net">
            <ext:content status="pending" type="xpath">
                  /pidf:presence/dm:person/rpid:activities
            </ext:content>
            <ext:content status="pending" type="xpath">
                  /pidf:presence/dm:person/rpid:mood
            </ext:content>
            <ext:content status="pending" type="xpath">
                  /pidf:presence/dm:person/rpid:place-type
            </ext:content>
      </ext:watcher-contents>
      <ext:watcher-contents watcher="sip:userB@example.net">
            <ext:content status="pending" type="xpath">
                  /pidf:presence/dm:person/gp:geopriv/
                  gp:location-info
            </ext:content>
      </ext:watcher-contents>
</ext:watcher-contents-list>
</watcherinfo>
```

Table 6 Shows Example Watcher Information Extension Based on Approach 1

The following Table 7 is the schema definition for the extension part of Watcher information described in Approach 1:

```
<?xml version="1.0" encoding="UTF-8"?>
<xs:schema targetNamespace="urn:watcherContentInfo"
                  xmlns="urn:watcherContentInfo"
      xmlns:xs="http://www.w3.org/2001/XMLSchema"
                  elementFormDefault="qualified"
                  attributeFormDefault="unqualified">
<!-- This import brings in the XML language attribute xml:lang-->
      <xs:import namespace="http://www.w3.org/XML/1998/namespace"
schemaLocation="http://www.w3.org/2001/03/xml.xsd"/>
      <xs:element name="watcher-contents-list">
            <xs:complexType>
                  <xs:sequence>
                  <xs:element ref="ns-bindings" minOccurs="0"/>
                  <xs:element ref="watcher-contents" minOccurs="0"
maxOccurs="unbounded"/>
                  <xs:any namespace="##other" processContents="lax"
minOccurs="0" maxOccurs="unbounded"/>
                  </xs:sequence>
                  <xs:anyAttribute namespace="##other"/>
            </xs:complexType>
      </xs:element>
      <xs:element name="ns-bindings">
            <xs:complexType>
                  <xs:sequence>
      <xs:element name="ns-binding" maxOccurs="unbounded">
                  <xs:complexType>
                                    <xs:attribute
name="prefix" type="xs:string" use="required"/>
                              <xs:attribute name="urn" type="xs:anyURI"
use="required"/>
                  </xs:complexType>
            </xs:element>
                  </xs:sequence>
            </xs:complexType>
      </xs:element>
      <xs:element name="watcher-contents">
            <xs:complexType>
                  <xs:sequence>
                        <xs:element ref="content" minOccurs="0"
maxOccurs="unbounded"/>
                  </xs:sequence>
                  <xs:attribute name="watcher" type="xs:anyURI"
use="required"/>
            </xs:complexType>
      </xs:element>
      <xs:element name="content">
            <xs:complexType>
                  <xs:simpleContent>
                        <xs:extension base="xs:string">
                              <xs:attribute name="status"
use="required">
                                    <xs:simpleType>
                                          <xs:restriction
base="xs:string">
            <xs:enumeration value="pending"/>
            <xs:enumeration value="active"/>
                                          </xs:restriction>
                                    </xs:simpleType>
                              </xs:attribute>
                              <xs:attribute name="type"
use="required">
                                    <xs:simpleType>
                                          <xs:restriction
base="xs:string">
            <xs:enumeration value="xpath"/>
                                          </xs:restriction>
                                    </xs:simpleType>
                              </xs:attribute>
                        </xs:extension>
                  </xs:simpleContent>
            </xs:complexType>
      </xs:element>
</xs:schema>
```

Approach 2

This approach purposes to reuse the approach used in Presence Authorization Rule per draft-ietf-simple-presence-rules to express the requested content, where the presence attributes are expressed like <provide-devices>, <provide-activities> etc. Here in this approach the root element "watcherinfo" of the Watcher information document as described in RFC 3858 is extended to contain "watcher-contents-list" element which carries the details of the contents requested by each Watchers and their identity. "watcher-contents-list" element contains any number of "watcher-contents" element to carry the details of Watchers and the part of the Presence Information they have requested. The "watcher-contents" element must have an attribute named "watcher" whose value is URI of the Watcher. The "watcher-contents" element can have presence information data format elements as described in the draft-ietf-simple-presence-rules. As the requested contents have been represented in the unit of presence information data format which is the same way that the Presence Content Rule in Presence Authorization Rule uses to express the allowed contents in <transformations> element, the Presentity would be able to easily update the Presence Content Rule per the Approach 2.

The following Table 8 is an example of Watcher information extension for a Presentity sip:mayur@samsung.com which per the above Approach 2. This example contains the same Watcher information as the example in Table 6, but is coded per the above Approach 2.

```
<?xml version="1.0"?>
<watcherinfo xmlns="urn:ietf:params:xml:ns:watcherinfo"
xmlns:rpid="urn:ietf:params:xml:ns:pidf:rpid"
xmlns:ext="urn:watcherContentInfo"
version="0" state="full">
<watcher-list resource="sip:mayur@samsung.com" package="presence">
            <watcher status="active" id="8ajksjda7s"
duration-subscribed="509"                event="approved"
>sip:userA@example.net</watcher>
            <watcher status="pending" id="hh8juja87s997-ass7"
display-name="Mr.                             Subscriber"
event="subscribe">sip:userB@example.org</watcher>
</watcher-list>
```

```
<ext:watcher-contents-list>
    <ext:watcher-contents watcher="sip:userA@example.net">
        <ext:activities          status="pending"/>
        <ext:mood
        status="pending"/>
        <ext:placy-type          status="pending"/>
    </ext:watcher-contents>
    <ext:watcher-contents watcher="sip:userB@example.net">
<ext:geopriv                    status="pending"/>
    </ext:watcher-contents>
</ext:watcher-contents-list>
</watcherinfo>
```

The following Table 9 is the schema definition for the format of Watcher information extension described in Approach 2.

```
<?xml version="1.0" encoding="UTF-8"?>
<xs:schema targetNamespace="urn:watcherContentInfo"
           xmlns="urn:watcherContentInfo"
           xmlns:xs="http://www.w3.org/2001/XMLSchema"
    elementFormDefault="qualified"
    attributeFormDefault="unqualified">
        <!-- This import brings in the XML language attribute xml:lang-->
<xs:import              namespace="http://www.w3.org/XML/1998/
namespace" schemaLocation="http://www.w3.org/2001/03/xml.xsd"/>
        <xs:element name="watcher-contents-list">
                                     <xs:complexType>
                <xs:sequence>
<xs:element ref="watcher-contents" minOccurs="0"
maxOccurs="unbounded"/>
<xs:any   namespace="##other"   processContents="lax"
minOccurs="0" maxOccurs="unbounded"/>
                </xs:sequence>
                <xs:anyAttribute processContents="lax"/>
                                     </xs:complexType>
                </xs:element>
                <xs:element name="watcher-contents">
                                     <xs:complexType>
                <xs:sequence>
    <!-- Sequence of elements that represents Presence Data Information
Format. element should have the "status" element that shows the
authorization status of the requested contents -->
                </xs:sequence>
                <xs:attribute name="watcher" type="xs:anyURI" use="required"/>
                                     </xs:complexType>
                </xs:element>
</xs:schema>
```

Figure 3:
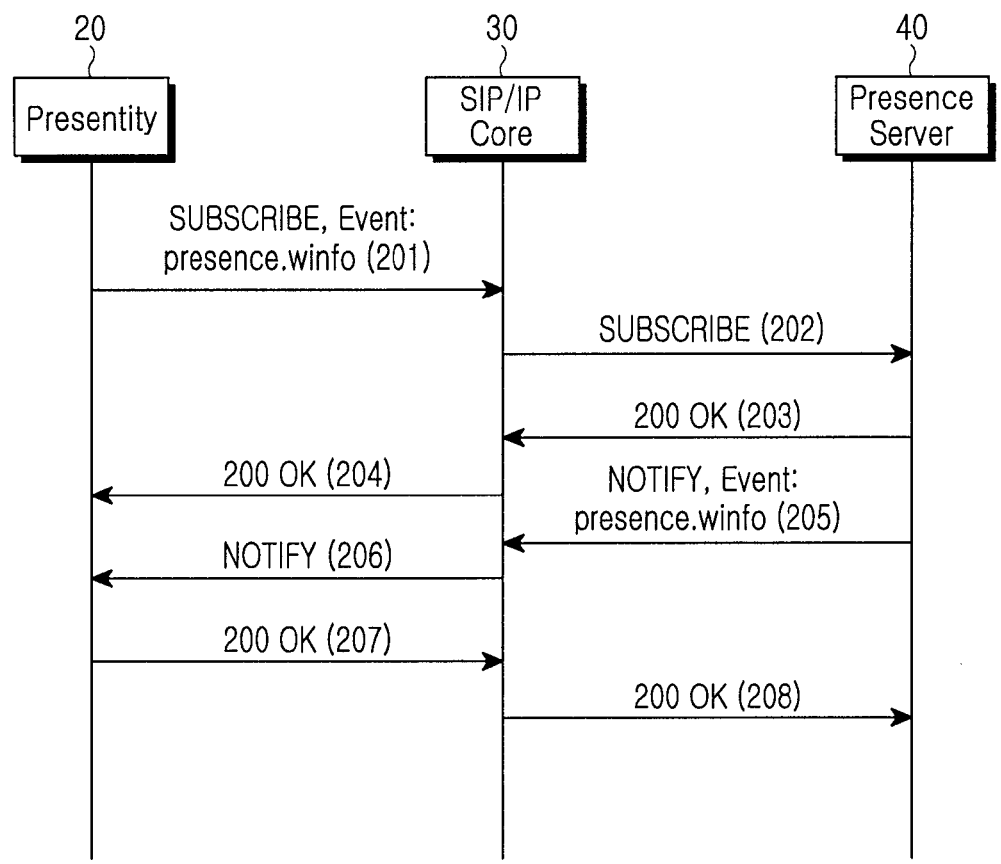
FIG. 3 depicts conveying the identity of the watchers and the protected contents to Presentity using the method "extending the format of watcher information proposed in the present invention.

FIG. 3 shows the example flow to convey the identity of the Watchers and the protected contents to Presentity by utilizing Watcher Information extension as proposed in this section.

The following describes each step in FIG. 3.

In step 201, the Presentity 20 wishing to know the list of Watchers who are subscribed for his/her Presence Information and to know the contents they have requested for sends a SIP SUBSCRIBE request to SIP/IP core 30 subscribing for the extended "presence.winfo" event package per this invention.

In step 202, the SIP/IP core 30 forwards the request to the Presence Server 40 of Presentity's domain.

In step 203, the Presence Server 40 processes the received SIP SUBSCRIBE and upon successful processing sends 200 OK response to SIP/IP Core 30.

In step 204, the SIP/IP core 30 forwards the 200 OK response to the Presentity 20.

In step 205, Presence Server 40 sends the SIP NOTIFY request containing the details of the Watchers who are subscribed for Presentity's Presence Information and what contents they have requested as proposed by this invention. The format of the contents sent in SIP NOTIFY request can be either formats as described in the two approaches of section 1.2.1.

In step 206, SIP/IP Core 30 forwards the SIP NOTIFY request to the Presentity 20.

In step 207, Presentity 20 sends 200 OK response.

In step 208, SIP/IP Core 30 forwards the 200 OK response to the Presence Server 40.

1.2.2 Creation of New Event Package to Convey the Identity of the Watchers and the Protected Contents to Presentity 1. RFC 3265 defines a generic framework for subscription to and notifications of events related to SIP systems. As an alternate method to 1.2.1, this invention defines a new event package to convey the details of Watchers and the protected content they have requested. The name of the new package is "presence.winfo.content". The functionality of the framework is similar to the one described in RFC 3265 and the NOTIFY message carries the XML document which contains the details of the Watchers and the protected contents they requested.

2. The format of the XML content is same as the one described in the previous section 1.2.1 as the extension to the Watcher Information format. The extension part to the existing Watcher information document which is described in the two approaches of the section 1.2.1 is re-used here and they act as an independent format.

3. The following Table 10 is the example SIP SUBSCRIBE request on "presence.winfo.content" event package. Here, the Presentity "sip:mayur@example.com" subscribes to his own "presence.winfo.content" event.

```
SUBSCRIBE sip:mayur@example.com SIP/2.0
Via: SIP/2.0/TCP terminal.example.com;branch=z9hG4bKwYb6QREiCL
    Max-Forwards: 70
From: <sip:mayur@example.com>;tag=ie4hbb8t
To: <sip:mayur@example.com>
Call-ID: cdB34qLToC@terminal.example.com
CSeq: 322723822 SUBSCRIBE
Contact: <sip:terminal.example.com>
Event: presence.winfo.content
Expires: 7200
Accept: application/watcherinfo-content+xml
```

As response to the above example SUBSCRIBE request in Table 10, The following Table 11 is the example SIP NOTIFY request on "presence.winfo.content" event package to the Presentity "sip:mayur@example.com", with the details of the content requested by the Watchers and their identity being embedded as the content of this NOTIFY request. The content reuses the same format as described in the Approach 1 in the section 1.2.1. The content type for this information is "application/watcherinfo-content+xml".

With this information, the Presentity "sip:mayor@exmaple.com" can learn about the following information:

First, the Watcher "sip:userA@example.com" has requested the Presence Information of the Presentity. Among the requested parts of the Presence Information, the requests for "activities", "mood", "place-type" presence attributes have not been allowed per the presence Presentity's Presence Content Rule in Presence XDMS.

Second, the Watcher "sip:userB@example.com" has requested the Presence Information of the Presentity. Among the requested parts of the Presence Information, the request for the "location-info" presence attributes has not been allowed per the present Presentity's Presence Content Rule in Presence XDMS.

Based on this information, the Presentity may want to modify his present Presence Content Rule in Presence XDMS to selectively allow the requested contents to the Watchers.

```
NOTIFY sip:mayur@example.com SIP/2.0
Via: SIP/2.0/TCP PresenceServer.example.com SIP/
2.0;branch=z9hG4bKna998sk
From: <sip:mayur@example.com>; tag=ffd2
To:<sip:mayur@example.com>;tag=ie4hbb8t
Call-ID: cdB34qLToC@terminal.example.com
Event: presence.winfo.content
Subscription-State: active
Max-Forwards: 70
CSeq: 8775 NOTIFY
Contact: <sip:PresenceServer.example.com>
Content-Type: application/watcherinfo-content+xml
Content-Length: ...
<?xml version="1.0"?>
<ext:watcher-contents-list xmlns:ext="urn:watcherContentInfo">
              <ext:ns-bindings>
        <ext:ns-binding prefix="pidf" urn="urn:ietf:params:xml:ns:pidf"/>
<ext:ns-binding prefix="dm"    urn="urn:ietf:params:xml:ns:pidf:data-
model"/>
       <ext:ns-binding prefix="rpid"
       urn="urn:ietf:params:xml:ns:pidf:rpid"/>
     <ext:ns-binding prefix="gp"
   urn="ietf:params:xml:ns:pidf:geopriv10"/>
                   </ext:ns-bindings>
        <ext:watcher-contents watcher="sip:userA@example.net">
              <ext:content status="pending" type="xpath">
              /pidf:presence/dm:person/rpid:activities
                     </ext:content>
              <ext:content status="pending" type="xpath">
              /pidf:presence/dm:person/rpid:mood
                     </ext:content>
              <ext:content status="pending" type="xpath">
              /pidf:presence/dm:person/rpid:place-type
                     </ext:content>
              </ext:watcher-contents>
        <ext:watcher-contents watcher="sip:userB@example.net">
              <ext:content status="pending" type="xpath">
              /pidf:presence/dm:person/gp:geopriv/gp:location-info
                     </ext:content>
                     </ext:watcher-contents>
</ext:watcher-contents-list>
```

Table 11 shows an example of NOTIFY request on "presence.winfo.content" event package with the contents per the Approach 1 in section 1.2.1.

As response to the above example SUBSCRIBE request in Table 10, the following Table 12 shows the example SIP NOTIFY request on "presence.winfo.content" event package to the Presentity "sip:mayor@example.com" with the contents per the Approach 2 in section 1.2.1. The content delivers the same information as the above Table 11, but reuses the format as described in the Approach 2 in the section 1.2.1.

```
NOTIFY sip:mayur@example.com SIP/2.0
Via: SIP/2.0/TCP PresenceServer.example.com SIP/
2.0;branch=z9hG4bKna998sk
From: <sip:mayur@example.com>; tag=ffd2
To:<sip:mayur@example.com>;tag=ie4hbb8t
Call-ID: cdB34qLToC@terminal.example.com
Event: presence.winfo.content
Subscription-State: active
Max-Forwards: 70
CSeq: 8775 NOTIFY
Contact: <sip:PresenceServer.example.com>
Content-Type: application/watcherinfo-content+xml
Content-Length: . . .
<?xml version="1.0"?>
<ext:watcher-contents-list xmlns:ext="urn:watcherContentInfo">
          <ext:watcher-contents watcher="sip:userA@example.net">
                     <ext:activities        status="pending"/>
                     <ext:mood
                     status="pending"/>
                     <ext:placy-type        status="pending"/>
              </ext:watcher-contents>
          <ext:watcher-contents watcher="sip:userB@example.net">
                     <ext:geopriv           status="pending"/>
                     </ext:watcher-contents>
</ext:watcher-contents-list>
```

Figure 4:
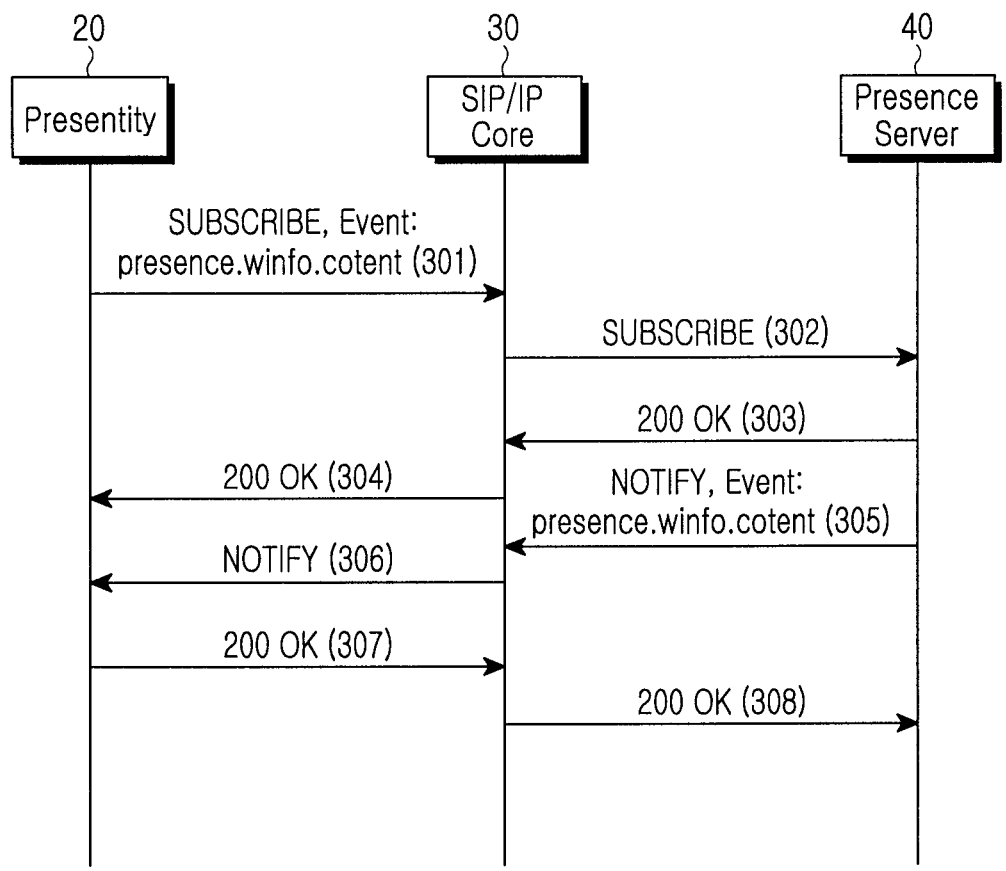
FIG. 4 depicts conveying the identity of the Watchers and the protected contents to Presentity by using a new event package named "presence.winfo.content" proposed in the present invention.

FIG. 4 shows the example flow to convey the identity of the Watchers and the protected contents to Presentity by using the new event package of "presence.winfo.content" as proposed in this section.

Following are steps involved in FIG. 4.

In step 301, the Presentity 20 wishing to know the details of the contents requested by the Watchers who are subscribed for his/her Presence Information sends an SIP SUBSCRIBE request to SIP/IP core 30 subscribing for "presence.winfo-.content" event package per this invention.

In step 302, the SIP/IP core 30 forwards the request to the Presence Server 40 of Presentity's domain.

In step 303, the Presence Server 40 processes the received SIP SUBSCRIBE and upon successful processing sends 200 OK response to SIP/IP Core 30.

In step 304, the SIP/IP core 30 forwards the 200 OK response to the Presentity 20.

In step 305, the Presence Server 40 sends the SIP NOTIFY request containing the details of the Watchers who are subscribed for Presentity's Presence Information and what content they have requested as proposed by this invention. The format of the content sent in SIP NOTIFY request can be either of format described in the two approaches of section 1.2.2.

In step 306, the SIP/IP Core 30 forwards the SIP NOTIFY request to the Presentity 20.

In step 307, the Presentity 20 sends 200 OK response.

In step 308, the SIP/IP Core 30 forwards the 200 OK response to the Presence Server 40.

1.2.3. Using Multipart/Mixed Content Type to Convey the Protected Contents Requested by Watchers This approach proposes to use the "multipart/mixed" content type as described in [RFC2387] in order to aggregate the Watcher Information and the protected contents requested by the watchers. In this format the root document contains the watcher information document as described in RFC 3858 and the remaining part contains the details of the protected contents requested by each watchers. The remaining part of the "multipart/mixed" content types contains the details of the protected content by each of the watcher. The format of this document could be any of the following:

1. Format explained in Approach 1 of the section 1.2.1 of this document [see Table 7]

2. Format explained in Approach 2 of the section 1.2.1 of this document [see Table 9]

3. Event Notification Filtering document as described in RFC 4661 with the clarifications explained in section 1.2.3.1 of this document.

1.2.3.1 Re-Using Event Notification Filter Document

This invention proposes to re-use the Event Notification Filtering document for conveying the details of the protected contents requested by the watchers to the Presentity with the clarifications as described below.

Clarifications:

The Presence Server of the Presentity domain figures out the protected contents if any, requested by the watchers, by applying the corresponding presence Authorization rules and also the Event notification filter requested by the watcher. Then, by using the Event notification of the Presentity described in sections 1.2.1 and 1.2.2, the Presence Server of the Presentity domain can forward the recognized protected content to the Presentity in the form of the Event notification filter. In this case, if a particular watcher has requested for any protected contents of the Presentity the Presence Server constructs the Filter document using the <include> element and sets the "uri" attribute of the <filter> element to the URI of the watcher. Presence of any other attributes other than "uri" should be ignored by the presentity. Usage of <exclude> and <trigger> elements are discouraged. This way the Presence Server constructs filter document for all the watchers who have requested for the protected contents and aggregate all the information as "multipart/mixed" content type and send in the notification of watcher information subscription. If the <filter> element has no "uri" attribute, it can be extended to other new attributes for forwarding the Watcher's identity. The Presence Server notifies that all namespace bindings may be forwarded to the Presentity when the Presence Server aggregates filters from all of the watchers.

Table 13 shows an example NOTIFY containing the multipart/mixed content type wherein one part contains the watcher information and the other part contains the filter document which is aggregation of protected content requested by the watchers.

```
NOTIFY sip:mayur@samsung.com SIP/2.0
Via:           SIP/2.0/TCP              PresenceServer.example.com
SIP/2.0;branch=z9hG4bKna998sk
From: <sip:mayur@example.com>; tag=ffd2
To:<sip:mayur@example.com>;tag=ie4hbb8t
Call-ID: cdB34qLToC@terminal.example.com
Event: presence.winfo
Subscription-State: active
Max-Forwards: 70
CSeq: 8775 NOTIFY
Contact: sip:PresenceServer.example.com
Content-Type: "multipart/mixed"; boundary="aaaabbbbcccc"
-- aaaabbbbcccc
     Content-Transfer-Encoding: binary
     Content-Type: application/watcher-info+xml;charset="UTF-8"
     <?xml version="1.0"?>
<watcherinfo xmlns="urn:ietf:params:xml:ns:watcherinfo"
xmlns:rpid="urn:ietf:params:xml:ns:pidf:rpid"
xmlns:ext="urn:watcherContentInfo"
version="0" state="full">
<watcher-list resource="sip:mayur@samsung.com" package="presence">
              <watcher status="active" id="8ajksjda7s"
duration-subscribed="509"                  event="approved"
>sip:userA@example.net</watcher>
              <watcher status="pending" id="hh8juja87s997-ass7"
display-name="Mr.                                      Subscriber"
event="subscribe">sip:userB@example.org</watcher>
</watcher-list>
</watcherinfo>
-- aaaabbbbcccc
     Content-Transfer-Encoding: binary
     Content-Type: application/simple-filter+xml;charset="UTF-8"
<?xml version="1.0" encoding="UTF-8"?>
     <filter-set xmlns="urn:ietf:params:xml:ns:simple-filter" >
       <ns-bindings>
         <ns-binding prefix="game-ext"
              urn="urn:ietf:params:xml:ns:game-ext"/>
       </ns-bindings>
       <filter uri="userA@example.net">
         <what>
           <include>
            /pidf:presence/dm:person/rpid:activities
           </include>
                    <include>
              /pidf:presence/dm:person/gp:geopriv/gp:location-info
                    </include>
         </what>
       </filter>
       <filter uri="userB@example.net">
         <what>
           <include>
```

-continued

```
           </include>
                    <include>
              /pidf:presence/dm:person/gp:geopriv/gp:location-info
                    </include>
         </what>
       </filter>
     </filter-set>
```

Table 13 shows an example for conveying the protected contents requested by watchers to the Presentity using "multipart/mixed" content type.

1.2.4 Content Indirection Mechanism

The present invention proposes other mechanism for forwarding the Watcher's identity and the details of the protected content that have requested by the Watchers to the Presentity by using the content indirection mechanism, as described in [RFC4483]. In order to achieve the content indirection, the present invention proposes that the Presence Server stores statuses of protected content within the Presence Server, or in other places such as a content server in a separate MIME format as described in the above sections 1.2.2 and 1.2.3, and then forwards the URI of the stored information to the Presentity by extending contents of Watcher information notification. The mechanism is required as follows.

In order to forward uri of the indirected content, one of <watcher-list> and <watcher-info> elements of the format of Watcher Information (RFC 3858) may be extended to include a new element or a new attribute. The Presentity, having received the uri of the indirected content, may retrieve the status of the protected contents in order to perform Reactive Authorization.

Table 14 shows an example of using the content indirection mechanism in order to forward the status of the protected contents to the Presentity.

```
NOTIFY sip:mayur@samsung.com SIP/2.0
Via:           SIP/2.0/TCP              PresenceServer.example.com
SIP/2.0;branch=z9hG4bKna998sk
From: <sip:mayur@example.com>; tag=ffd2
To:<sip:mayur@example.com>;tag=ie4hbb8t
Call-ID: cdB34qLToC@terminal.example.com
Event: presence.winfo.content
Subscription-State: active
Max-Forwards: 70
CSeq: 8775 NOTIFY
Contact: sip:PresenceServer.example.com
Content-Type: "multipart/related"; boundary="aaaabbbbcccc"
-- aaaabbbbcccc
     Content-Transfer-Encoding: binary
     Content-Type: application/watcher-info+xml;charset="UTF-8"
     <?xml version="1.0"?>
<watcherinfo xmlns="urn:ietf:params:xml:ns:watcherinfo"
xmlns:rpid="urn:ietf:params:xml:ns:pidf:rpid"
xmlns:ext="urn:watcherContentInfo"
version="0" state="full">
<watcher-list              resource="sip:mayur@samsung.com"
package="presence">
              <watcher status="active" id="8ajksjda7s"
duration-subscribed="509"                  event="approved"
>sip:userA@example.net</watcher>
              <watcher status="pending" id="hh8juja87s997-ass7"
display-name="Mr.                                      Subscriber"
event="subscribe">sip:userB@example.org</watcher>
</watcher-list>
<protected-contents>cid:1134299224244@example.net</protected-
contents>
</watcherinfo>
-- aaaabbbbcccc
Content-Type: message/external-body;
              access-type="URL";
              expiration="Mon, 24 June 2009 09:00:00 GMT";
```

-continued

```
            URL="http://www.example.net/mayur/prot-
contents/";
            size=234422
            Content-Type: application/watcherinfo-content+xml
            Content-ID: <1134299224244@example.net >
Content-Description: Status of Protected contents.
-- aaaabbbbcccc
```

1.3. A Method in which the Watcher Represents Preference in Order to Receive Notification for the Presence Contents Based on RFC 4661, when the watcher adds the identifying presence element to the filtered presence information document, <added> filter element is used to trigger content forwarding. The present invention also proposes utilizing the <added> filter element for Reactive Content Authorization such as the presence element specified in the <added> filter element indicating an obvious request of the Watcher that receives the specific element. Therefore, the Presence Server receiving a filter having the <added> element may analyze it in the following ways.

a) When the presence information element listed in the <added> element already authorizes the Watcher, it is possible to include these elements, as one part of an initial NOTIFY, and send the elements to the watcher.

b) When the presence information element listed in the <added> element does not authorize the Watcher, the presence information elements may include only these elements, as one part of the protect content to transmit to the Presentity, in order to authorize Reactive Authorization. In this case, the Presence Server may delay an initial NOTIFY request for a specific time period so that the Presentity modifying the Presence Authorization Rule allows the specific content for the watcher. If the authorization does not occur within the time of the specific period, the Presence Server sends the initial NOTIFY request having the allowed presence content to the watcher.

Table 15 shows an example of the event notification filter document for forwarding the watcher presence that receives the notification by using the <added> element.

```
<?xml version="1.0" encoding="UTF-8"?>
    <filter-set xmlns="urn:ietf:params:xml:ns:simple-filter" >
            <ns-bindings>
                                                            <ns-
binding prefix="pidf" urn="urn:ietf:params:xml:ns:pidf"/>
                                                            <ns-
binding prefix="dm"   urn="urn:ietf:params:xml:ns:pidf:data-model"/>
                                                            <ns-
binding prefix="rpid" urn="urn:ietf:params:xml:ns:pidf:rpid"/>
                                                            <ns-
binding prefix="gp"   urn="ietf:params:xml:ns:pidf:geopriv10"/>
            </ns-bindings>
        <filter uri="userA@example.net">
            <what>
            <include>
            /pidf:presence/dm:person/rpid:activities
            </include>
                        <include>
            /pidf:presence/dm:person/gp:geopriv/gp:location-info
                                                            </include>
        </what>
                                                            <trigger>
                <added>
            /pidf:presence/dm:person/gp:geopriv/gp:location-info
            </added>
            <added>
                        /pidf:presence/dm:person/rpid:activities
                                    </added>
        </filter>
</filter-set>
```

1.4. Presentity performing Reactive Presence Authorization by Modifying Presence Authorization Rule in Presence XDMS.

Upon receiving the above information on the Watcher's requests for the protected content of the Presence Information per the mechanisms described in the above section 1.1 and 1.2, Presentity may elect to perform the Content-level Reactive Presence Authorization to selectively authorize the Watcher's requests on the protected contents of the Presentity's Presence information. The Presentity can achieve this Content-level Reactive Presence Authorization by modifying as such, the Presence Content Rule in the Presentity's Presence Authorization Rule in Presence XDMS, using the XCAP operations. Then, these changes in Presence Content Rule in the Presence Authorization Rule will be notified to Presence Server, then the Presence Server applies this updated Presence Content Rule to authorize the Watcher's requests on the protected contents of the Presentity's Presence Information and deliver those to the requesting Watcher.

2. Dynamic Mechanism

In the previous section 1 this invention discussed about "Static Mechanism" for achieving the Content-level Reactive Presence Authorization. This inventions further proposes another dimension to achieve Content-level Reactive Presence Authorization in dynamic manner, which is called "Dynamic Mechanism" or "Direct Mechanism".

The "Static Mechanism" in section 1 requires the Presentity to update the static Presence Authorization Rule in Presence XDMS to perform the Content-level Reactive Presence Authorization. As such, the Content-level Reactive Presence Authorization per the "Static Mechanism" in section 1 exists persistently and continues to be applied to the future requests from the Watchers.

Compared to the "Static Mechanism", this "Dynamic Mechanism" does not require any modification to the existing Presence Authorization Rule document to perform the Content-level Reactive Presence Authorization, but with the "Dynamic Mechanism" the Presentity sends the Content-level Reactive Presence Authorization directly to the Presence Server. As such, the Content-level Reactive Presence Authorization using the "Dynamic Mechanism" does hold only for the Watcher's pending or active subscription duration.

Further, this invention proposes that this "Dynamic Mechanism" for the Content-level Reactive Presence Authorization can also be applied for the Reactive Presence Authorization of subscription as well as that of contents. In other words, this "Dynamic Mechanism" for Reactive Presence Authorization can be applied for both Subscription Authorization Rule and Content Authorization Rule. (Note that the Presence Authorization Rule consists of Subscription Authorization Rule and Content Authorization Rule.) As such, this invention calls the "Dynamic Mechanism" as the "Dynamic Reactive Presence Authorization".

With the Dynamic Reactive Presence Authorization, this invention proposes that the Presence Authorization Rule in Presence Server that the Presence Server uses to authorize the presence requests from Watchers is the composite view of the following two parts of the Presence Authorization Rule:

The former is Static Presence Authorization Rule that is based on the Presence Authorization Rule document in Presence XDMS, and the latter is Volatile Presence Authorization Rule set directly by the Presentity.

As mentioned above, the volatile part of the Presence Authorization Rule in Presence Server holds during Watcher's pending or active subscription duration. So, the same Presence Authorization Rule in Presence Server will be applied for re-SUBSCRIBE request. Also, the same Presence Authorization Rule in Presence Server will be applied for every SIP NOTIFY to the Watcher. But, it should be noted that, upon termination of the Watcher's current active subscription, the volatile part of Presence Authorization Rule in Presence Server will disappear.

To achieve the Dynamic Reactive Presence Authorization this invention proposes the following steps:

1. Presentity specifying the conditions for Presence Server to trigger the Reactive Presence Authorization for protected contents. This can be achieved per the mechanisms proposed in section 1.1;

2. Conveying the identity of the Watchers and the protected contents to Presentity. This can be achieved per the mechanisms proposed in section 1.2;

3. Presentity performing Reactive Presence Authorization by sending the authorization directly to Presence Server.

Alternatively, this invention proposes that Presence Server directly asks Presentity for Reactive Presence Authorization, then Presentity responses directly to the Presence Server with the Reactive Presence Authorization.

2.1 Presentity Performing Reactive Presence Authorization Directly to Presence Server As described in the above section 1., this invention proposes that Presence Server have the composite view of Presence Authorization Rule by composing the static Presence Authorization Rule from Presence XDMS and the volatile Presence Authorization Rule that comes directly from Presentity. This invention proposes to denote the volatile Presence Authorization Rule as the new event package called "presauth".

Upon the information on the Watcher's requests for the Presentity's Presence Information, the Presentity may elect to authorize the Watcher's request just for one time rather than in persistent manner. This invention proposes that the Presentity that wants such volatile Presence Authorization issue the PUBLISH request for the "presauth" event package to Presence Server. The body of such PUBLISH requests carries the "volatile" Presence Authorization Rule. The content type for this body can be "application/presauth+xml".

Upon receiving this PUBLISH request on "presauth" event package with Presence Authorization Rule from Presentity, the Presence Server will compose this "volatile" Presence Authorization Rule with the static Presence Authorization Rule from Presence XDMS. When composing, the "volatile" rule will take precedence over the "static" rule in case that those rules collide. For easy composition with static Presence Authorization Rule, the content of "dynamic" Presence Authorization Rule can have the same format as the static Presence Authorization Rule. The Presence Server can wait for some specific period of time to receive the dynamic Authorization rule. If no rule is received from the Presentity within the specified time the Presence Server can apply the static Authorization rule.

As this is a new event package, Presentity can also use SIP event SUBSCRIBE/NOTIFY (RFC 3857) to get synchronized with the "volatile" Presence Authorization Rule in Presence Server.

The following Table 13 shows the example PUBLISH requests on the "presauth" event package with the body containing the "volatile" Presence Authorization Rule as proposed by this invention, which Presentity of "sip:Presentity@example.com" sends to Presence Server.

```
PUBLISH sip:Presentity@example.com SIP/2.0
Via: SIP/2.0/UDP pua.example.com;branch=z9hG4bK652hsge
To: <sip:Presentity@example.com>
From: <sip:Presentity@example.com>;tag=1234wxyz
Call-ID: 81818181@pua.example.com
CSeq: 1 PUBLISH
Max-Forwards: 70
Event: presauth
Content-Type: application/presauth+xml
Content-Length: . . .
<?xml version="1.0" encoding="UTF-8"?>
<cr:ruleset
    xmlns:op="urn:oma:xml:prs:pres-rules"
    xmlns:pr="urn:ietf:params:xml:ns:pres-rules"
    xmlns:rpid="urn:ietf:params:xml:ns:pidf:rpid"
    xmlns:cr="urn:ietf:params:xml:ns:common-policy">
  <cr:rule id="ck81">
    <cr:conditions>
      <cr:identity>
        <cr:one id="sip:user@example.com"/>
      </cr:identity>
    </cr:conditions>
    <cr:actions>
      <pr:sub-handling>allow</pr:sub-handling>
    </cr:actions>
    <cr:transformations>
      <pr:provide-services>
        <op:service-id>org.openmobilealliance:PoC-session</op:service-id>
      </pr:provide-services>
      <op:provide-willingness>true</op:provide-willingness>
      <pr:provide-status-icon>true</pr:provide-status-icon>
    </cr:transformations>
  </cr:rule>
</cr:ruleset>
```

Figure 5:
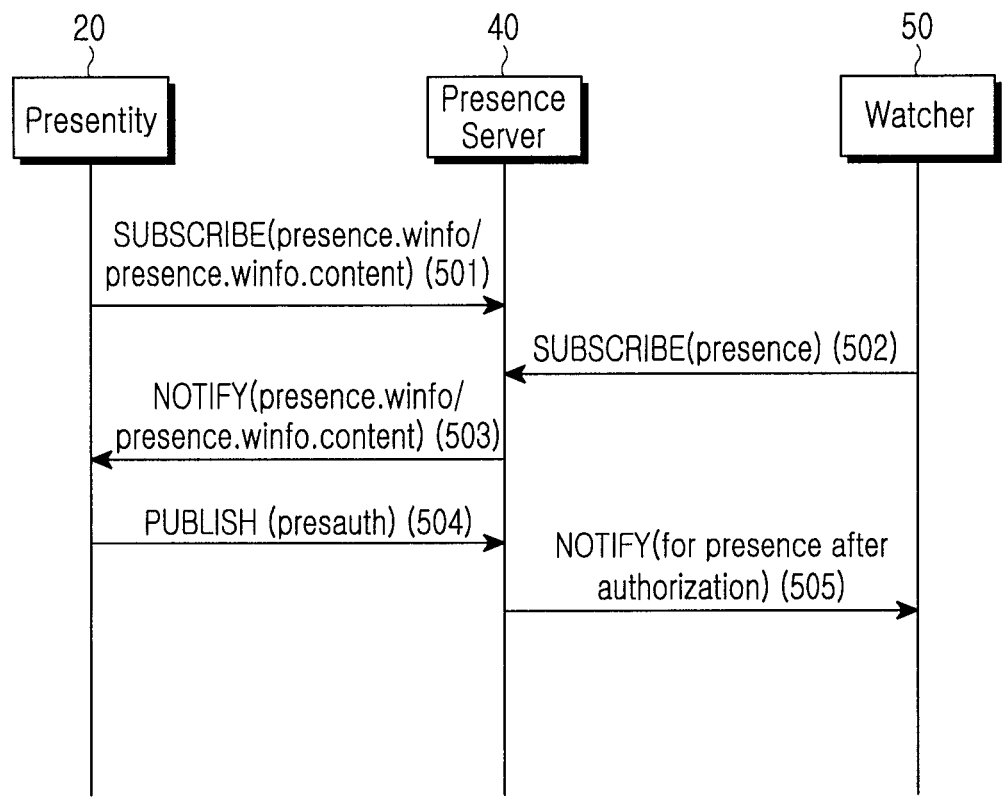
FIG. 5 depicts conveying the identity of the Watchers and the protected contents to Presentity by using an event notification, and issuing PUBLISH request on "presauth" event package so that the Presentity may directly deliver temporary Presence Authorization Rule to which the Content-level Reactive Presence Authorization is applied to the Presence Server proposed in the present invention.

The following FIG. 5 shows the example flows where Presentity issues PUBLISH request on "presauth" event package to deliver the volatile Presence Authorization Rule to Presence Server.

Following steps describe the steps in FIG. 5:

In step 501, the Presentity 20 in order to get to know the details of the Watchers' requests for presence subscription and the contents of the Presentity's Presence Information they have requested would send SIP SUBSCRIBE subscribing for "presence.winfo" event package with extensions proposed in this invention (section 1.2.1) or for "presence.winfo.content" event package as described in the section 1.2.2.

In step 502, watcher 50 sends SIP SUBSCRIBE to subscribe for the Presence Information of the Presentity. But, this Watcher 50 is not yet authorized by Presentity 20 based on the static Presence Authorization Rule in Presence XDMS.

In step 503, the Presence Server 40 sends a SIP NOTIFY request on either "presence.winfo" event package with extensions by this invention or "presence.winfo.content" event package. This SIP NOTIFY request carries the details of the Watcher lists and their requests for the protected contents as proposed by this invention.

In step 504, presentity 20 wishing to authorize the Watcher just for one time rather than persistently sends the SIP PUBLISH request on "presauth" event package to Presence Server 40 with its body containing the volatile Presence Authorization Rule as proposed by this invention.

In step 505, the Presence Server 40 sends SIP NOTIFY request to the Watcher 50 which contains the valid Presence Information which he/she is reactively authorized to view.

2.2 Presence Server Directly Asking Presentity for Reactive Presence Authorization This invention further proposes an alternative method for the Presentity getting to know the details of the Watchers' requests for presence subscriptions and the protected contents they have requested, wherein: Presence Server directly delivers the status of Watchers' requests, asking for Presentity to perform the Reactive Presence Authorization.

In the previous methods the Presentity have to subscribe for the information on Watcher requested contents by using the methods described in the section 1.2 of this document.

But here in this alternative method there is no need for the Presentity to do subscribe for Watcher content information; instead, the Presence Server directly pushes the information to the Presentity, directly asking for Presentity's Reactive Presence Authorization.

For this method, this invention proposes to utilize the SIP MESSAGE or other appropriate SIP methods. The content type of the SIP MESSAGE could be "application/reactive-auth+xml" and the format of the document carried in the SIP MESSAGE would be similar to the format describe in the section 1.2 of this document.

Upon receiving this information from Presence Server, Presentity can respond to the Presence Server with the Reactive Presence Authorization as previously described methods in this invention.

Other steps like Specifying the conditions for Presence Server to trigger the Reactive Presence Authorization for protected contents and Presentity performing Reactive Presence Authorization directly to Presence Server remains the same for this alternative method. The Presence Server can wait for some specific period of time to receive the dynamic Authorization rule. If no rule is received from the Presentity within the specified time the Presence Server can apply the static Authorization rule.

Figure 6:
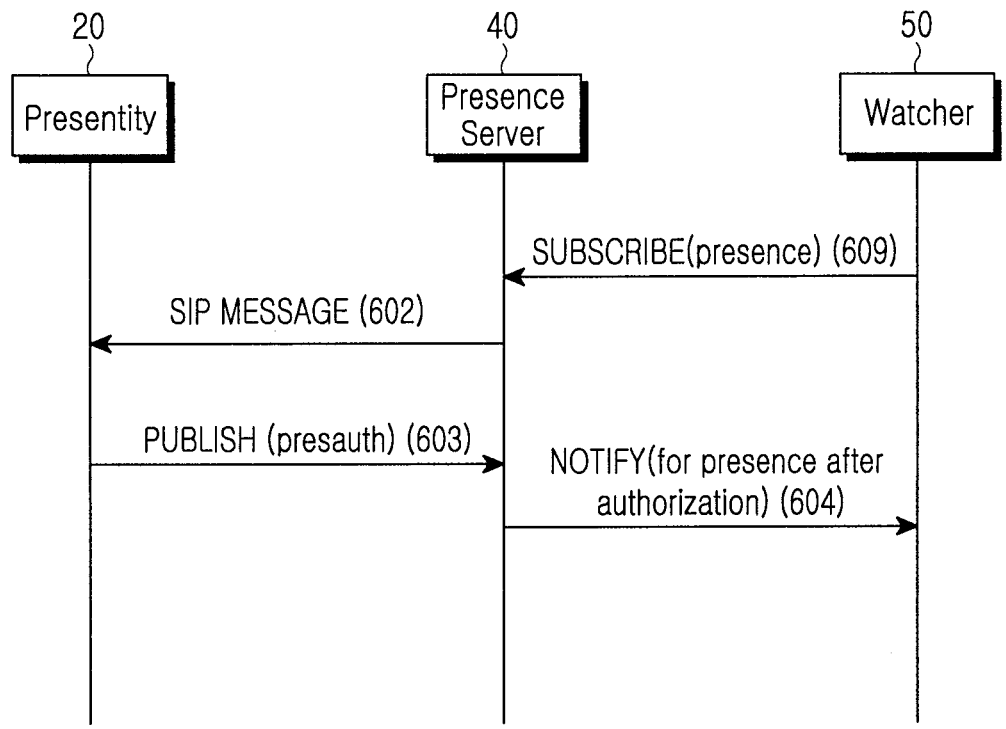
FIG. 6 depicts conveying the identity of the Watchers and the protected contents to Presentity through pushing by the Presence Server, and issuing PUBLISH request on "presauth" event package by Presentity in order to directly deliver temporary Presence Authorization Rule to which the Content-level Reactive Presence Authorization is applied to the Presence Server proposed in the present invention.

The following FIG. 6 shows the example flows of this alternate methods. Compared to the above FIG. 5, the only difference is that: instead of using the "presence.winfo" or "presence.winfo.content" event package, the Presence Server pushes the information on the Watcher's requests for subscription and the protected contents of the Presentity's Presence Information using the SIP MESSAGE method with this information in the body. Therefore, the detailed description for steps 601 to 604 will be omitted.

INDUSTRIAL APPLICABILITY

Although several exemplary embodiments of the present invention have been described for illustrative purposes, those skilled in the art will appreciate that various modifications, additions and substitutions are possible, without departing from the scope and spirit of the invention as disclosed in the accompanying claims.

The invention claimed is:

1. A presence server, comprising:
    a transceiver that receives, from a watcher, a subscription request for presence information of a presentity, and receives, from the presentity, an updated presence authorization rule to allow the subscription request for the presence information to the watcher; and
    a processor that applies a presence authorization rule corresponding to the subscription request, and controls the transceiver to deliver, to the watcher, the presence information requested by the watcher, based on the updated presence authorization rule;
    wherein the processor sets a subscription state of the subscription request as a pending state, if a value related to the presence authorization rule is "confirm", and
    wherein the processor determines that the presence information requested by the watcher is not allowed during the pending state.

2. The presence server of claim 1, wherein the processor
    determines that the presence information requested by the watcher is not allowed, based on the application of the presence authorization rule,
    controls the transceiver to deliver a request for reactive authorization to the presentity, and
    receives, from the presentity, the updated presence authorization rule through the transceiver, in response to the request for the reactive authorization.

3. The presence server of claim 1, wherein the processor sets the subscription state of the subscription request as the pending state, if the value of the sub-handling element related to the presence authorization rule is "confirm".

4. The presence server of claim 1, wherein each of the presence authorization rule and the updated presence authorization rule includes a subscription authorization rule and a presence content rule.

5. The presence server of claim 1, wherein the presence authorization rule specifies predefined permissions by the presentity on the presence information requested by the watcher.

6. A method of a presence server, the method comprising:
    receiving, by the presence server, from a watcher, a subscription request for presence information of a presentity;
    applying, by the presence server, a presence authorization rule corresponding to the subscription request;
    receiving, by the presence server, from the presentity, an updated presence authorization rule to allow the subscription request for the presence information to the watcher; and
    delivering, by the presence server, to the watcher, the presence information, based on the updated presence authorization rule,
    wherein the presence server sets a subscription state of the subscription request as a pending state, if a value related to the presence authorization rule is "confirm", and
    wherein the presence server determines that the presence information requested by the watcher is not allowed during the pending state.

7. The method of claim 6, wherein receiving the updated presence authorization rule comprises:
    determining, by the presence server, that the presence information requested by the watcher is not allowed, based on the applying of the presence authorization rule;
    delivering, by the presence server, a request for reactive authorization to the presentity; and
    receiving the updated presence authorization rule in response to the request for the reactive authorization.

8. The method of claim 6, wherein the presence server sets the subscription state of the subscription request as the pending state, if the value of the sub-handling element related to the presence authorization rule is "confirm".

9. The method of claim 6, wherein each of the presence authorization rule and the updated presence authorization rule includes a subscription authorization rule and a presence content rule.

10. The method of claim 6, wherein the presence authorization rule specifies predefined permissions by the presentity on the presence information requested by the watcher.

11. A method of a watcher, the method comprising:
    transmitting, by the watcher, to a presence server, a subscription request for presence information of a presentity; and
    receiving, by the watcher, the presence information requested by the watcher, based on a presence authorization rule updated by the presentity, wherein the updated presence authorization rule, which allows the subscription request for the presence information to the watcher, is transmitted from the presentity to the presence server, wherein the subscription request is set as a pending state, if a value related to the presence authorization rule is "confirm", and wherein the presence information requested by the watcher is not allowed during the pending state.

12. The method of claim 11, wherein the presence authorization rule is applied by the presence server, and wherein the presence authorization rule specifies predefined permissions by the presentity on the presence information requested by the watcher.

13. The method of claim 12, wherein the updated presence authorization rule is transmitted in response to a request from the presence server to the presentity for reactive authorization, if the presence information requested by the watcher is not allowed, based on the applying of the presence authorization rule by the presence server.

14. The method of claim 13, wherein the subscription request is set as the pending state, if the value of the sub-handling element related to the presence authorization rule is "confirm".

15. A watcher, comprising:
a controller that generates a subscription request for presence information of a presentity; and
a transceiver that transmits the subscription request to a presence server, and receives the presence information requested by the watcher, based on a presence authorization rule updated by the presentity, wherein the updated presence authorization rule, which allows the subscription request for the presence information to the watcher, is transmitted from the presentity to the presence server, wherein the subscription request is set as a pending state, if a value related to the presence authorization rule is "confirm", and wherein the presence information requested by the watcher is not allowed during the pending state.

16. The watcher of claim 15, wherein the presence authorization rule is applied by the presence server, and wherein the presence authorization rule specifies predefined permissions by the presentity on the presence information requested by the watcher.

17. The watcher of claim 16, wherein the updated presence authorization rule is transmitted in response to a request from the presence server to the presentity for reactive authorization, if the presence information requested by the watcher is not allowed, based on the applying of the presence authorization rule by the presence server.

18. The watcher of claim 17, wherein the subscription request is set as the pending state, if the value of the sub-handling element related to the presence authorization rule is "confirm".

* * * * *